US005613043A
United States Patent [19]
Bigus

[11] Patent Number: 5,613,043
[45] Date of Patent: Mar. 18, 1997

[54] NEURAL NETWORK SHELL FOR APPLICATION PROGRAMS

[75] Inventor: Joseph P. Bigus, Rochester, Minn.

[73] Assignee: International Business Machines Corporation, Armonk, N.Y.

[21] Appl. No.: 459,213

[22] Filed: Jun. 2, 1995

Related U.S. Application Data

[62] Division of Ser. No. 75,370, Jun. 11, 1993, Pat. No. 5,450,529, which is a division of Ser. No. 849,116, Mar. 10, 1992, Pat. No. 5,222,196, which is a division of Ser. No. 482,450, Feb. 20, 1990, Pat. No. 5,142,665.

[51] Int. Cl.$^6$ ............................................. G06F 15/18
[52] U.S. Cl. ............................................. 395/26
[58] Field of Search ........................... 395/21, 22, 26, 395/76, 11

[56] References Cited

PUBLICATIONS

P. Koikkalainen and E. Oja, "Specification and Implementation Environment for Neural Networks Using Communicating Sequential Processes," IEEE Int'l Conf. on Neural Networks, pp. I–533 to I–540 Jul. 1988.
G. Works, "The Creation of Delta: A New Concept in ANS Processing," 1988 IEEE Int'l. Conf. on Neural Networks, pp. II–159 to II–164 Jul. 1988.
G. Whittington and C. Spracklen, "ANDS: A Second Generation Neural Network Development System," CONPAR '88, pp. 84–91 Sep. 1988.
J. McClelland and D. Rumelhart, Explorations in Parallel Distributed Processing—A Handbook of Models, Programs, and Exercises, The MIT Press, pp. 1–10, 137–152, 245–271. Dec. 1988.

R. Eberhart, et al., "CASENET: A Neural Network Tool for EEG Waveform Classification," 1989 Symp. on Computer–Based Medical Systems, pp. 60–68 Jun. 1989.
T. Korb and A. Zell, "A Declarative Neural Network Description Language," Microprocessing and Microprogramming, pp. 181–188 Aug. 1989.
J. Nijhuis, "Structure and Application of NNSIM: a general–purpose Neural Network SIMulator," Microprocessing and Microprogramming, pp. 189–194 Aug. 1989.
R. Brause, "Neural Network Simulation using INES," Tools for Artificial Intelligence, pp. 556–561 Oct. 1989.
"Neural–Network Vendors and Features," AI Expert, pp. 60–61 Dec. 1989.
P. Chen, The Neural Shell: A Neural Networks Simulator, Masters Thesis, Ohio State University, 87 pages Dec. 1989.

Primary Examiner—Robert W. Downs
Attorney, Agent, or Firm—Owen J. Gamon; Curtis G. Rose

[57] ABSTRACT

A neural network shell has a defined interface to an application program. By interfacing with the neural network shell, any application program becomes a neural network application program. The neural network shell contains a set of utility programs that transfers data into and out of a neural network data structure. This set of utility programs allows an application program to define a new neural network model, create a neural network data structure, train a neural network, and run a neural network. Once trained, the neural network data structure can be transported to other computer systems or to application programs written in different computing languages running on similar or different computer systems.

7 Claims, 27 Drawing Sheets

Neural Network Data Structure 50

| | Header Field Name | Length | Required |
|---|---|---|---|
| 61 | Pointer to Previous Neural Network | 16 | N |
| 62 | Pointer to Next Neural Network | 16 | N |
| 63 | Offset to next free space | 4 | Y |
| 64 | Offset to end of space | 4 | Y |
| 65 | Network Name | 10 | Y |
| 66 | Network Library | 10 | Y |
| 67 | Network Version Identifier | 10 | Y |
| 79 | Network Model (Type) | 10 | Y |
| 68 | Network Status | 10 | Y |
| 69 | Network String | 10 | N |
| 70 | Network Training Time | 10 | Y |
| 71 | Network Boolean Parameters (4) | 4 | N |
| 72 | Network Size Parameters (5) | 20 | N |
| 73 | Network Index Parameters (5) | 20 | N |
| 74 | Network Training Parameters (6) | 24 | N |
| 75 | Network Training Cycle Counter | 4 | Y |
| 76 | Network Array Offsets (16) | 256 | Y |
| 77 | Network Array Pointers (16) | 24 | Y |
| 78 | Network Array Data Types (16) | 24 | Y |
| | Variable-Length Data Area | 0-16 Meg | Y |
| | Array 1 2 . . . 15 16 | | |

FIG. 4

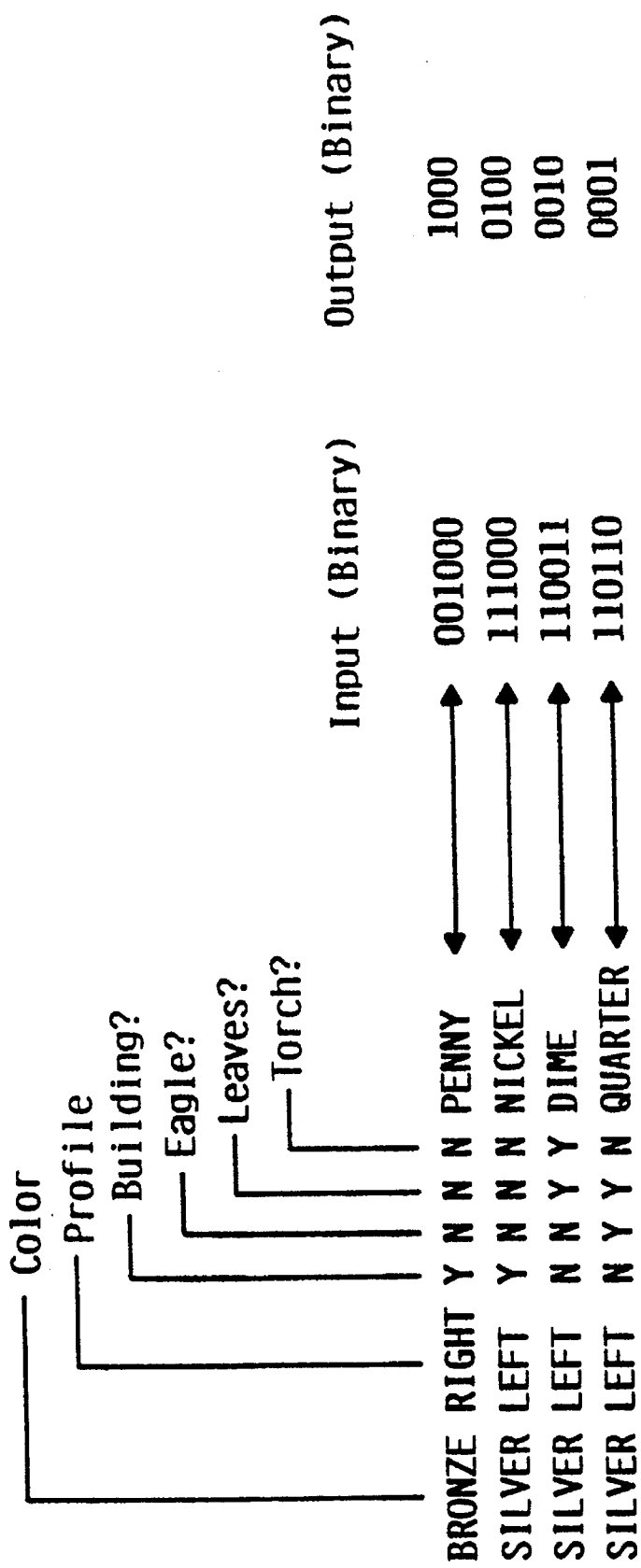

FIG. 11

```
          Create Neural Network (CRTNRLNET)

Type choices, press Enter.

Neural Network Name . . . . . . . >  COINNET        Name
   Library . . . . . . . . . .       *CURLIB        Name, *CURLIB
Neural Network Type . . . . . . >  *BKP           *BKP *ART *KMAP *TSP *BAM
Text 'description'. . . . . . . >  'Test BKP network for Coin ID Problem'

Bottom
F3=Exit  F4=Prompt  F5=Refresh  F12=Cancel  F13=How to use this display
F24=More Keys
```

```
Create BKP Neural Network (QNWCBKP)

Type choices, press Enter.

Neural Network Name . . . . . . . . >  COINNET       Name
  Library . . . . . . . . . . . . . >  *CURLIB       Name, *CURLIB
Number of Input Units . . . . . . .    6             1-1000
Number of Hidden Units L1 . . . . .    2             0-200
Number of Hidden Units L2 . . . . .    0             0-200
Number of Output Units  . . . . . .    4             1-1000
Text 'description'. . . . . . . . . >  'Test BKP network for Coin ID Problem Bottom
F3=Exit   F4=Prompt   F5=Refresh   F12=Cancel   F13=How to use this display
F24=More keys
```

FIG. 12

Teach Neural Network (TCHNRLNET)

Type choices, press Enter.

```
Data Set  . . . . . . . . . . .   QANWCOIN        Name
  Library  . . . . . . . . . .     *LIBL         Name, *LIBL, *CURLIB
Data Set Member  . . . . . . .   COINDEMO        Name, *FIRST
Neural Network . . . . . . . .   COINNET         Name
  Library  . . . . . . . . . .     *CURLIB       Name, *LIBL, *CURLIB
Interface program  . . . . . .   QNWGCOIN        Name
  Library  . . . . . . . . . .     *LIBL         Name, *LIBL, *CURLIB
Patterns per cycle . . . . . .   10              1-99999
Input mode . . . . . . . . . .   *AUTO           *AUTO, *ENTER
Display data . . . . . . . . .   *NO             *YES, *NO
Log data . . . . . . . . . . .   *NO             *YES, *NO
Initialize network . . . . . .   *NO             *YES, *NO
Interactive environment  . . .   *YES            *YES, *NO
```

Bottom

F3=Exit  F4=Prompt  F5=Refresh  F12=Cancel  F13=How to use this display
F24=More keys

```
                Teach Neural Network Environment

Data Set  . . . . . . . . . . :    QANWCOIN
  Library . . . . . . . . . . :    QNNU
  Member  . . . . . . . . . . :    COINDEMO Neural network  . . . . . . . :    COINNET
  Library . . . . . . . . . . :    *CURLIB Interface program . . . . . . :    QNWGCOIN
  Library . . . . . . . . . . :    QNNU Type choices, press Enter.

Log data  . . . . . . . . . . . .    N        Y=Yes, N=No
Display data  . . . . . . . . . .    N        Y=Yes, N=No
Input mode  . . . . . . . . . . .    1        1=Auto, 2=Enter F3=Exit  F9=Teach  F10=Save/load Network  F12=Cancel
```

```
                Teach Neural Network

Network . . . . . . . . . :  COINNET     Status . . . . . . . . . :  Training
Type . . . . . . . . . . . :  *BKP        Epochs . . . . . . . . . :         0

Network Training Parameters

Learn Rate . . . . . . . :  0.50000      Epoch update . . . . . . :  N
Momentum . . . . . . . . :  0.90000      Random inputs  . . . . . :  N
Pattern Error  . . . . . :  0.00000      Input Units  . . . . . . :         6
Epoch Error  . . . . . . :  0.00000      Hidden L1  . . . . . . . :         2
Tolerance  . . . . . . . :  0.10000      Hidden L2  . . . . . . . :         0
                                         Output Units . . . . . . :         4

Type choices, press Enter.

Patterns per cycle . . . . . . . . . :      10    1-99999
Refresh rate . . . . . . . . . . . . :      10    1-99999

F3=Exit  F9=Change Parameters  F10=Display Array
F12=Cancel
```

```
              Select Network Array

Type option, press Enter.
  1=Select

Option  Array
  1     Activations
  _     Weights
  _     Thresholds
  _     Weight deltas
  _     Threshold deltas
  _     Teach vector
  _     Error vector
  _     Error deltas
  _     Net inputs
  _     Weight derivatives
  _     Threshold derivative F3=Exit   F12=Cancel
```

FIG. 17

```
                Display Network Array

Network array  . . . . . . . . . :
Array index  . . . . . . . . . . :      Activations
Position to  . . . . . . . . . . :   1      1-16, F4 for list 1      0.00000    1.00000    1.00000    0.00000    0.00000
     6      0.00000    0.02918    0.01216    0.09496    0.71028
    11      0.42564    0.02567    0.00000    0.00000    0.00000

F3=Exit  F4=Prompt  F10=Step  F11=Cycle  F12=Cancel
```

Display Neural Network

| | | | | |
|---|---|---|---|---|
| Network . . . . . . . . . . . . : | COINNET | Status . . . . . . . . . . . . : | LOCKED | |
| Type . . . . . . . . . . . . . . : | *BKP | Epochs . . . . . . . . . . . . : | 328 | |
| Version . . . . . . . . . . . . : | 1.2-100989 | | | |
| | | | | |
| Parameter 1 . . . . . . . . . . : | 0.50000 | Boolean 1 . . . . . . . . . . : | N | |
| Parameter 2 . . . . . . . . . . : | 0.90000 | Boolean 2 . . . . . . . . . . : | N | |
| Parameter 3 . . . . . . . . . . : | 0.00000 | Boolean 3 . . . . . . . . . . : | N | |
| Parameter 4 . . . . . . . . . . : | 0.00000 | Boolean 4 . . . . . . . . . . : | | |
| Parameter 5 . . . . . . . . . . : | 0.10000 | Net String 1 . . . . . . . . : | | |
| Parameter 6 . . . . . . . . . . : | 0.00000 | Net Time . . . . . . . . . . : | 14.63 | |
| | | | | |
| Net Sizes 1 . . . . . . . . . . : | 6 | Net Index 1 . . . . . . . . . : | 7 | |
| Net Sizes 2 . . . . . . . . . . : | 2 | Net Index 2 . . . . . . . . . : | 8 | |
| Net Sizes 3 . . . . . . . . . . : | 0 | Net Index 3 . . . . . . . . . : | 9 | |
| Net Sizes 4 . . . . . . . . . . : | 4 | Net Index 4 . . . . . . . . . : | 8 | |
| Net Sizes 5 . . . . . . . . . . : | 12 | Net Index 5 . . . . . . . . . : | 9 | |

F3=Exit  F9=Display Offsets  F10=Display Array
F12=Cancel

FIG. 18

COIN IDENTIFICATION DEMO

Parameters                          Results

TYPE    : PENNY              TYPE    : PENNY

COLOR   : BRONZE             PENNY   : 0.9073972
PROFILE : RIGHT              NICKEL  : 0.0837411
BUILD   : Y                  DIME    : 0.0000205
EAGLE   : N                  QUARTER : 0.0009220
LEAVES  : N
TORCH   : N

F3=Exit  F9=Change Parameters  F10=Display Array
F12=Cancel

```
           COIN IDENTIFICATION DEMO

Parameters                          Results

TYPE    : NICKEL         TYPE    : NICKEL

COLOR   : SILVER         PENNY   :  0.0814387
PROFILE : LEFT           NICKEL  :  0.9090260
BUILD   : Y              DIME    :  0.0953377
EAGLE   : N              QUARTER :  0.0010652
LEAVES  : N
TORCH   : N

F3=Exit  F9=Change Parameters  F10=Display Array
F12=Cancel
```

FIG. 19C

COIN IDENTIFICATION DEMO

Parameters

TYPE    : DIME

COLOR   : SILVER
PROFILE : LEFT
BUILD   : N
EAGLE   : N
LEAVES  : Y
TORCH   : Y

Results

TYPE     : DIME

PENNY   : 0.0007919
NICKEL  : 0.0933161
DIME    : 0.9135095
QUARTER : 0.0552445

F3=Exit  F9=Change Parameters  F10=Display Array
F12=Cancel

FIG. 19D

```
          COIN IDENTIFICATION DEMO

Parameters                         Results

TYPE    : QUARTER          TYPE    : QUARTER

COLOR   : SILVER           PENNY   : 0.0005139
PROFILE : LEFT             NICKEL  : 0.0000019
BUILD   : N                DIME    : 0.0735790
EAGLE   : Y                QUARTER : 0.9069203
LEAVES  : Y
TORCH   : N
```

F3=Exit  F9=Change Parameters  F10=Display Array
F12=Cancel

FIG. 20

```
          COIN IDENTIFICATION DEMO

Type choices, Press Enter.

Parameters                        Results

TYPE    :                    TYPE    :  NICKEL

COLOR   : BRONZE             PENNY   :  0.2424682
     PROFILE : LEFT               NICKEL  :  0.4865323
     BUILD   : Y                  DIME    :  0.3173019
     EAGLE   : N                  QUARTER :  0.0923763
     LEAVES  : N
     TORCH   : N

F3=Exit  F12=Cancel
```

NEURAL NETWORK SHELL FOR APPLICATION PROGRAMS

This is a divisional of application Ser. No. 08/075,370 filed Jun. 11, 1993, now issued as U.S. Pat. No. 5,450,529 which is a divisional of application Ser. No. 07/849,116 filed on Mar. 10, 1992, now issued as U.S. Pat. No. 5,222,196, which was a divisional of application Ser. No. 07/482,450, filed on Feb. 20, 1990, now issued as U.S. Pat. No. 5,142,665.

FIELD OF THE INVENTION

This invention relates to the data processing field. More particularly, this invention is a neural network shell to allow application programs to use a neural network to perform computations.

BACKGROUND OF THE INVENTION

The human brain is made up of a group of neurons connected to one another in a network. When we learn something, new connections are made, or existing connections are modified, between the neurons. Neural networks are massively parallel computing models of the human brain, consisting of many simple processors connected by adaptive weights. Neural networks are being used in artificial intelligence-related applications. The parallel neural networks are often simulated on serial computers, with the processors simulated by program code, and the connections modeled by data.

Neural networks can be either supervised or unsupervised. Supervised neural networks differ from conventional programs in that a programmer does not write algorithmic code to tell them how to process data. Instead, a user 'trains' a neural network by presenting training data of the desired input/output relationships. As an extremely simple example, let us assume we need a neural network to determine if an input integer is odd or even. We could present training data as follows to the neural network: "1,ODD", "2,EVEN", "5,ODD", "121,ODD", etc. The neural network would learn that all positive integers equal to or less than 121 that are evenly divisible by 2 are "EVEN", and all other positive integers equal to or less than 121 are "ODD". Therefore, after the training session is over, if a user presented a "7" to the neural network as input data, the output result would be "ODD". Note that if we presented a "–14" as input data to the neural network, it may or may not know that this is an even number, since the training data did not "teach" the neural network anything about negative integers. It may correctly guess that –14 is even, but it will probably let the user know it has some doubts that it has arrived at the correct answer. In addition, the neural network may not know that a number such as 123232123121 is odd, since the training data did not include large numbers. Therefore, the quality of the neural network depends on the quality of the training data.

Unsupervised neural networks can extract statistically significant features from input data. This differs from supervised neural networks in that only input data is presented to the network during training.

There are many different types of computing models which fall under the label 'neural networks'. These different models have unique network topologies and learning mechanisms. Examples of known neural network models are the Back Propagation Model, the Adaptive Resonance Theory Model, the Self-Organizing Feature Maps Model, the Self-Organizing TSP Networks Model, and the Bidirectional Associative Memories Model. The neural network field is very dynamic, with new network models being proposed often.

Although neural network models are interesting and theoretically powerful, they are inflexible and difficult to use. Highly skilled programmers with knowledge in neural networks are required to write a specialized application program to incorporate the functions of one neural network model. These custom designed application programs are extremely expensive and limited in function, since they are can only perform one specific computation, like minimizing the distance a salesman travels. If a different computation is required, a different application program incorporating the functions of perhaps another, completely dissimilar neural network model must be written by perhaps a different highly skilled programmer familiar with this neural network model.

If it is desired to run these application programs on a different computer system, the whole application program, including the complex neural network component, must often be rewritten. This is clearly undesirable and a waste of precious programming resources. In addition to being rewritten, the neural network component will have to be retrained as well.

A normal application program written in a variety of computer languages by a normal programmer or user with little or no knowledge in neural networks cannot use the power of one or more neural network models to perform a wide range of computations.

The prior art has failed to adequately address the above problems. The prior art has largely been confined to theoretical and experimental applications that are unsuitable for commercial environments.

SUMMARY OF THE INVENTION

It is a principle object of the invention to provide a simple manner for application programs to perform computations using neural network models.

It is another object of the invention to provide a neural network shell that interfaces between an application program and a plurality of neural network models.

It is another object of the invention to provide a neural network shell that contains a neural network data structure that can be used by application programs written in different computing languages or running on different computer systems.

These and other objects are accomplished by the neural network shell for application programs disclosed herein.

A neural network shell has a defined interface to an application program. By interfacing with the neural network shell, any application program becomes a neural network application program. The neural network shell contains a set of utility programs that transfers data into and out of a neural network data structure. This set of utility programs allows an application program to define a new neural network model, create a neural network data structure, train a neural network, and run a neural network. Once trained, the neural network data structure can be transported to other computer systems or to application programs written in different computing languages running on similar or different computer systems.

The neural network data structure contains a header and a body. The header contains the name of the neural network, the name of the neural network model, the status of the neural network, and various parameters unique to the specific neural network model. The body of the neural network data structure contains data arrays unique to the specific neural network model. A wide variety of known neural network models, as well as neural network models not yet known or developed, can be mapped to the neural network data structure of the invention.

Input data and output results for the neural network can be kept in symbolic or numeric format in external storage. If the data is kept in symbolic format, a conversion is made to a numeric format for processing through the neural network. The numeric output result is then converted back to the desired symbolic format. The user can specify an existing conversion program, called a custom interface program or write his own tailored to meet the needs of his neural network application.

During the training process, relevant data from the neural network data structure is displayed for the user and/or logged, if desired.

BRIEF DESCRIPTION OF THE DRAWING

FIG. 4 shows the neural network data structure of the invention.

FIG. 10A shows an example of symbolic training data used in the invention.

FIG. 10B shows how the exemplary symbolic training data is converted to numeric training data.

FIGS. 11–18, 19A, 19B, 19C, 19D, and 20 shows screens displayed to a user creating, training, and running an example neural network using the invention.

DESCRIPTION OF THE PREFERRED EMBODIMENT

Figure 1:
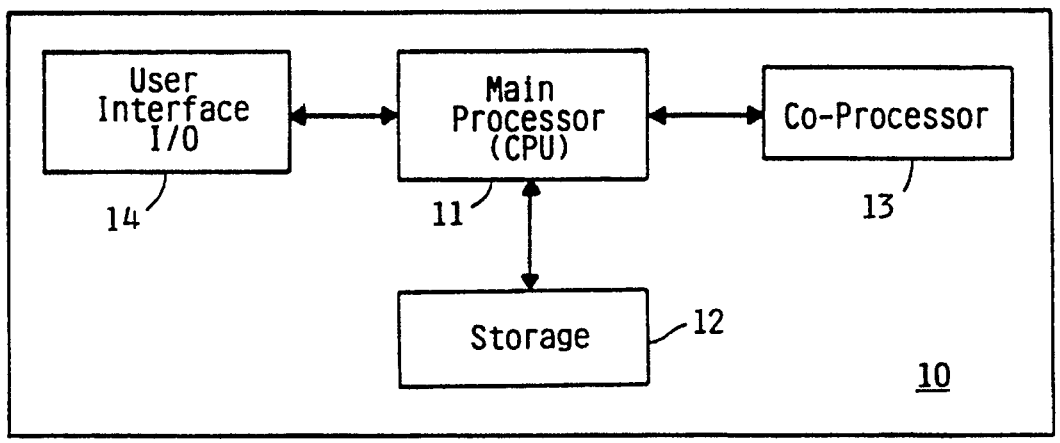
FIG. 1 shows a block diagram of the computer system of the invention.

FIG. 1 shows a block diagram of the computer system of the invention. Computer system 10 consists of main or central processing unit 11 connected to storage 12. Storage 12 can be primary memory such as RAM or secondary memory such as magnetic or optical storage. CPU 11 is in the preferred embodiment connected to co-processor 13. Co-processor 13 may provide generic math calculation functions (a math co-processor) or specialized neural network hardware support functions (a neural network processor). Co-processor 13 is not necessary if CPU 11 has sufficient processing power to handle an intensive computational workload without unacceptable performance degradation. CPU 11 is also connected to user interface 14. User interface 14 allows developers and users to communicate with computer system 10, normally through a programmable workstation.

In the preferred embodiment, computer system 10 is an IBM Application System/400 midrange computer, although any computer system could be used. Co-processor 13 is preferably a processor on the Application System/400 midrange computer, but could also be the math co-processor found on personal computers, such as the IBM PS/2. In this case, CPU 11 and co-processor 13 would communicate with each other via IBM PC Support.

Figure 2:
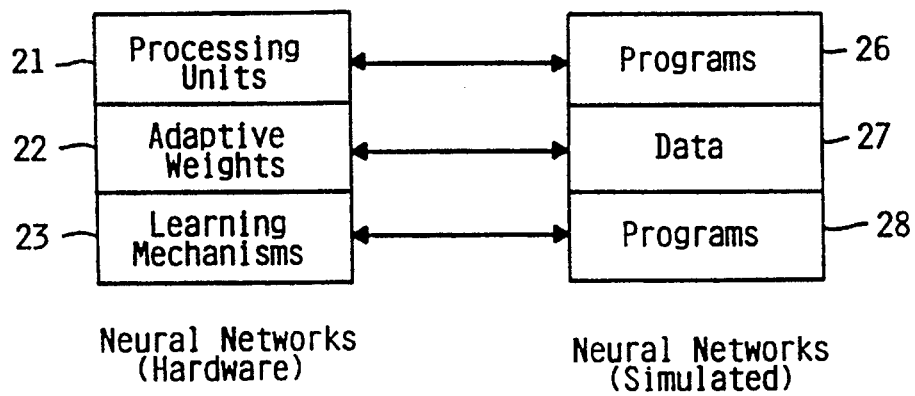
FIG. 2 shows how a massively parallel hardware implemented neural network can be simulated on a serial Von Neumann based computer system.

FIG. 2 shows how neural network (parallel) computers can be simulated on a Von Neumann (serial) processor system. There are many different neural network models with different connection topologies and processing unit attributes. However, they can be generally classified as computing systems which are made of many (tens, hundreds, or thousands) simple processing units 21 which are connected by adaptive (changeable) weights 22. In addition to processors and weights, a neural network model must have a learning mechanism 23, which operates by updating the weights after each training iteration.

A neural network model can be simulated on a digital computer by programs and data. Programs 26 simulate the processing functions performed by neural network processing units 21, and adaptive connection weights 22 are contained in data 27. Programs 28 are used to implement the learning or connection weight adaptation mechanism 23.

Figure 3A:
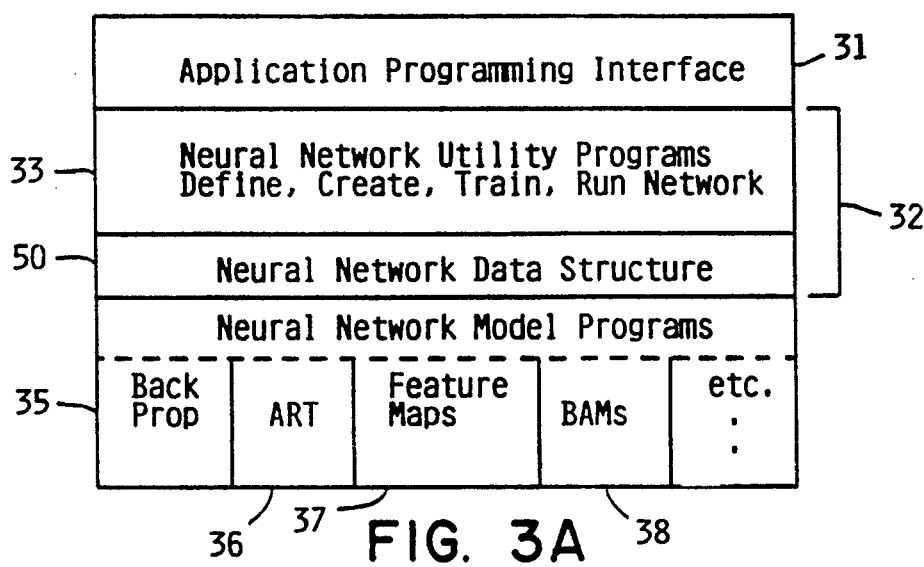
FIGS. 3A–3B shows a conceptual framework of the computing environment of the invention

FIG. 3A shows the conceptual layout of this invention and how it relates to application software. At the highest level is application programming interface 31 (API). API 31 is a formally specified interface which allows application developers lacking expert knowledge of neural networks to access and use the utility programs and data structure of neural network shell 32 in their application programs.

Neural network shell 32 consists of a set of utility programs 33 and a neural network data structure 50. Shell 32 provides the capability for easily and efficiently defining, creating, training, and running neural networks in applications on conventional computing systems.

Any neural network model, such as example models 35–38, can be supported by neural network shell 32 by defining a generic neural network data structure 50 which can be accessed by all of the utility programs in neural network shell 32. Each neural network model is mapped onto this generic neural network data structure, described in more detail in FIG. 4. Programs specific to each neural network model are called by neural network utility programs 33, as will be discussed later.

Figure 3B:
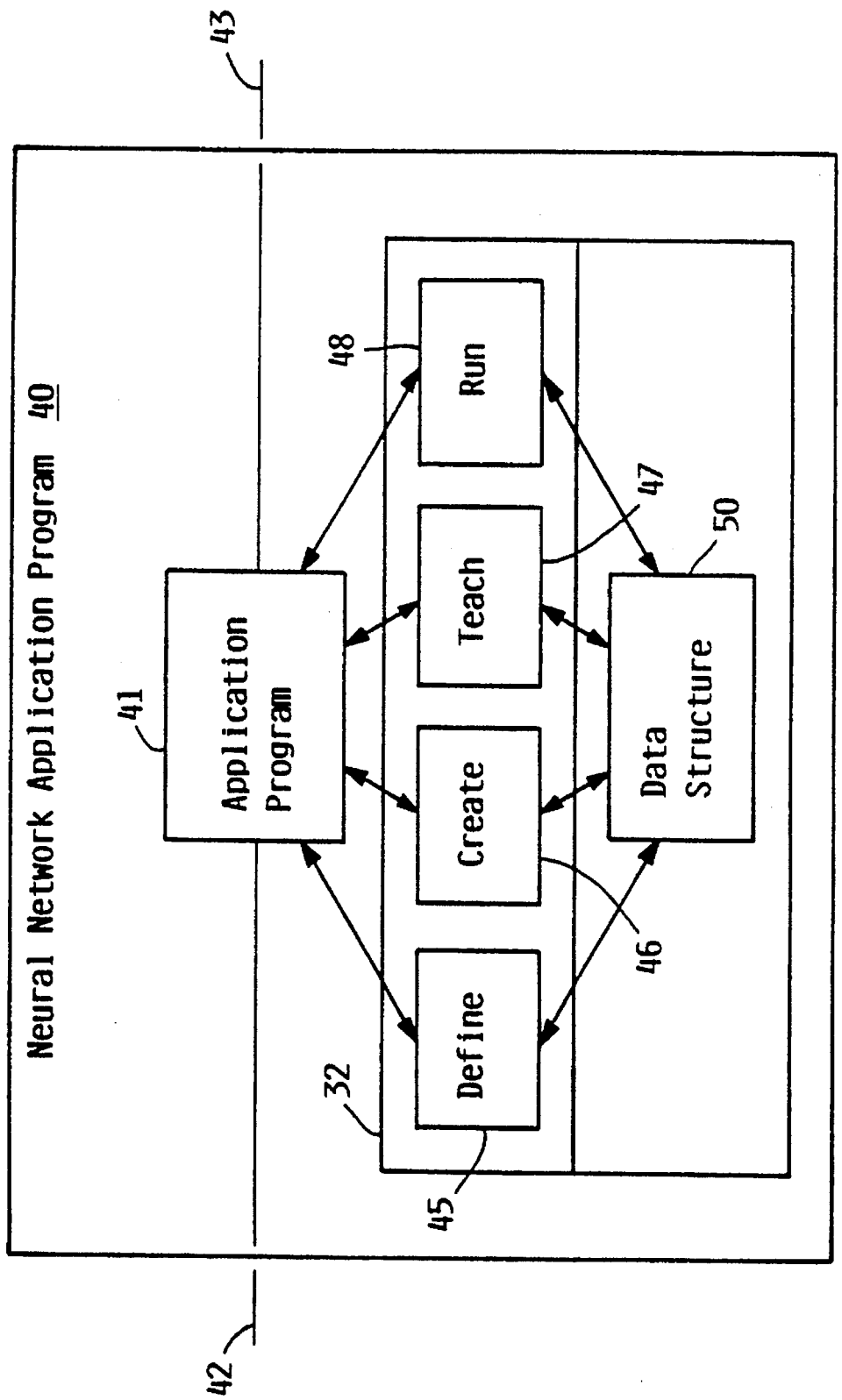

FIG. 3B shows how a normal application program 41 becomes a neural network application program 40 by interfacing with one or more of the neural network utility programs 45–48 in neural network shell 32. Utility programs 45–48 in turn interface with data structure 50. Data to be processed by neural network application program 40 (also referred to herein as "neural network") enters on input 42. After the data is run through the neural network, the result is output on output 43. Application program 41 and utility programs 45–48 reside in suitably programmed CPU 11 and/or co-processor 13 (FIG. 1). Data structure 50 resides in storage 12 and/or in internal storage of CPU 11 and/or co-processor 13.

FIG. 4 shows neural network data structure 50 of the invention. Data structure 50 provides a common framework which allows any neural network model to be defined for use in an application program. This common framework is accomplished by providing several of the fields in neural network data structure 50 for model specific parameters. Pages 103–105 of the "AS/400 Neural Network Utility: User's Guide and Reference PRPQ P84189" (order number SC21-8202-0), hereby incorporated by reference shows how the model specific fields of data structure 50 are used by the Back Propagation, ART, Self Organizing Feature Map, TSP, and BAM neural network models (unpublished and unavailable to the public as of the filing date of this patent application).

Data structure 50 consists of header portion 60 and body portion 90. Header portion 60 contains fields 61–79. Fields 61 and 62 are pointers to other neural network data structures, if any. If neural networks are arranged in a linked list for serial processing of data, the first pointer would link to the previous network. This link can be used to obtain the outputs from the previous sub-net in the larger network. The second pointer would be a pointer to the next network. Depending on the collection of sub-networks, either or both of these links would be used in a complex (hybrid) network composed of several sub-networks.

Neural network data structures can be chained together to provide increased flexibility and function to the application program. Providing the capability of linking to two additional neural networks allows "super" networks made up of modules of networks. Field 63 is an offset in bytes to the next free space in body portion 90. Field 64 is an offset in bytes to end of the neural network data structure. Since body portion 90 is a variable length data area, fields 63 and 64 are needed to keep track of the size of the data structure and the next available free space in body portion 90.

Field 65 contains the name of the neural network. An example neural network is discussed later that determines if a coin is a penny, nickel, dime, or quarter based on input data that contains attribute information about the coin (whether it is copper or silver, whether the person is facing left or right, and whether there is a building, eagle, leaves, or a torch on the coin or not). The name of this network is COINNET, and this name is placed in field 65 by the create neural network utility program, as will be discussed later.

Field 66 contains the name of the library where the neural network is located and is required in the preferred embodiment. In the AS/400, programs are stored in libraries. Libraries are similar to sub directories in the personal computing environment. Field 66 would not be necessary in computing environments without libraries. Field 67 contains the network version identifier. This information is used to prevent mismatches between neural network shell programs and neural network data structures. As new versions or releases of software are developed, compatibility with existing networks is desirable. If any enhancements require changes to the fundamental network data structure, this field would allow detection of a software-to-data mismatch. The software could call a conversion routine to update the data structure format, or accept down-level data structures.

Field 79 contains the name of the neural network model or type. An example neural network model name is "*BKP" for Back Propagation.

Field 68 contains the current state of the network. Possible states are 'INITIALIZE' if the network is being created, 'TRAINING' if the network is being trained, or 'LOCKED' if the training is complete and ready to run.

Field 69 is an optional field for storing a model specific alphanumeric field, if desired. Field 70 keeps track of the elapsed network training time in seconds.

Fields 71–74 contain different types of parameters used differently by specific neural network models. Field 71 contains up to four network Boolean parameters. A Back Propagation neural network model, for example, uses two of these parameters for determining whether epoch update and random input is enabled or disabled. The network Boolean parameters are also known as network flags. Of course, field 71 (as well as other fields of data structure 50) could be made larger or smaller to accommodate fewer or greater than the number of parameters used in the preferred embodiment, if desired. Field 72 contains network size parameters. This field contains up to five model-specific network size integer parameters. Field 73 contains up to five model-specific network index integer parameters. Field 74 contains up to six model-specific network training real parameters, such as learn rate, momentum, epoch error, etc.

Field 75 keeps track of the number of training epochs (an epoch is an iteration through the complete set of training data) of the neural network. Field 76 contains an array of offsets in bytes to the start of each model-specific array in body portion 90. Field 77 contains an array of resolved pointers to the start of each model-specific array in body portion 90. Field 78 contains an array of parameters describing the type of data held in each array. For example, some neural models accept only binary inputs. In the preferred embodiment, if a parameter in field 78 contains a "1" then its corresponding array contains bitmapped data. If the parameter is a "2" then its corresponding array contains single precision floating point data (the default). If it is "3" then its corresponding array contains fixed point zoned decimal data. These parameters are used to make more efficient use of storage.

The contents of body portion 90 of data structure 50 will now be discussed. Body portion 90 is a variable-length data area which contains a number (sixteen in the preferred embodiment) of model-specific arrays. Pages 103–105 of Attachment I shows the arrays mapped to header portion 60 and body portion 90 for each of the exemplary neural network models. For example, the back propagation model maps eleven arrays to body portion 90: activations, weights, threshold, weight deltas, etc, as shown under the heading "Array Mapping" on page 103.

Figure 7A:
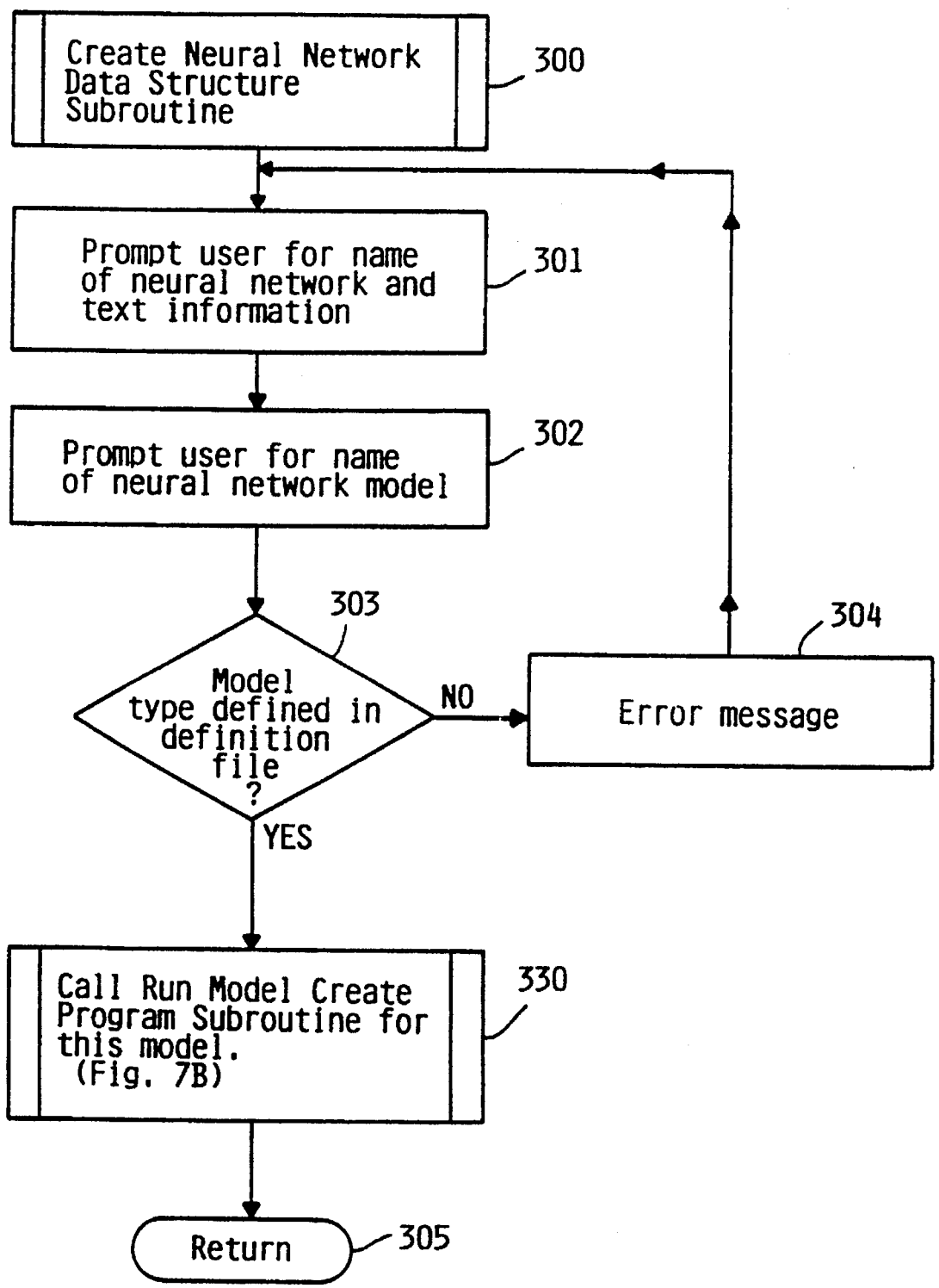
Figure 7B:
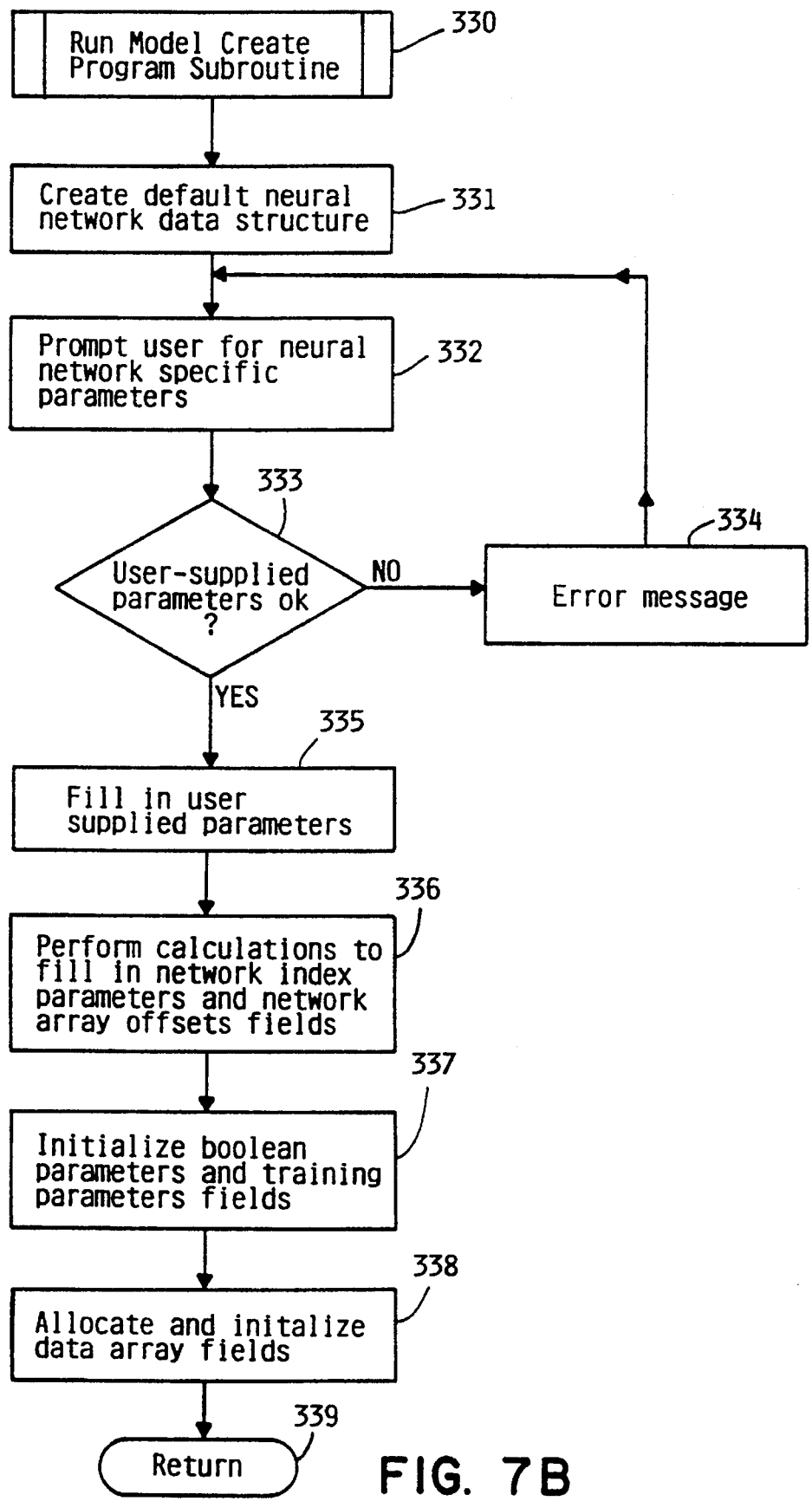

Data structure 50 is created by the Create Neural Network utility program, as will be discussed later (FIGS. 7A–7B). The Teach and Run utility programs access the header information to initialize the pointers to the data area arrays. The data in the data area arrays in turn are used in the simulation of the neural network training and calculation processes.

Figure 5:
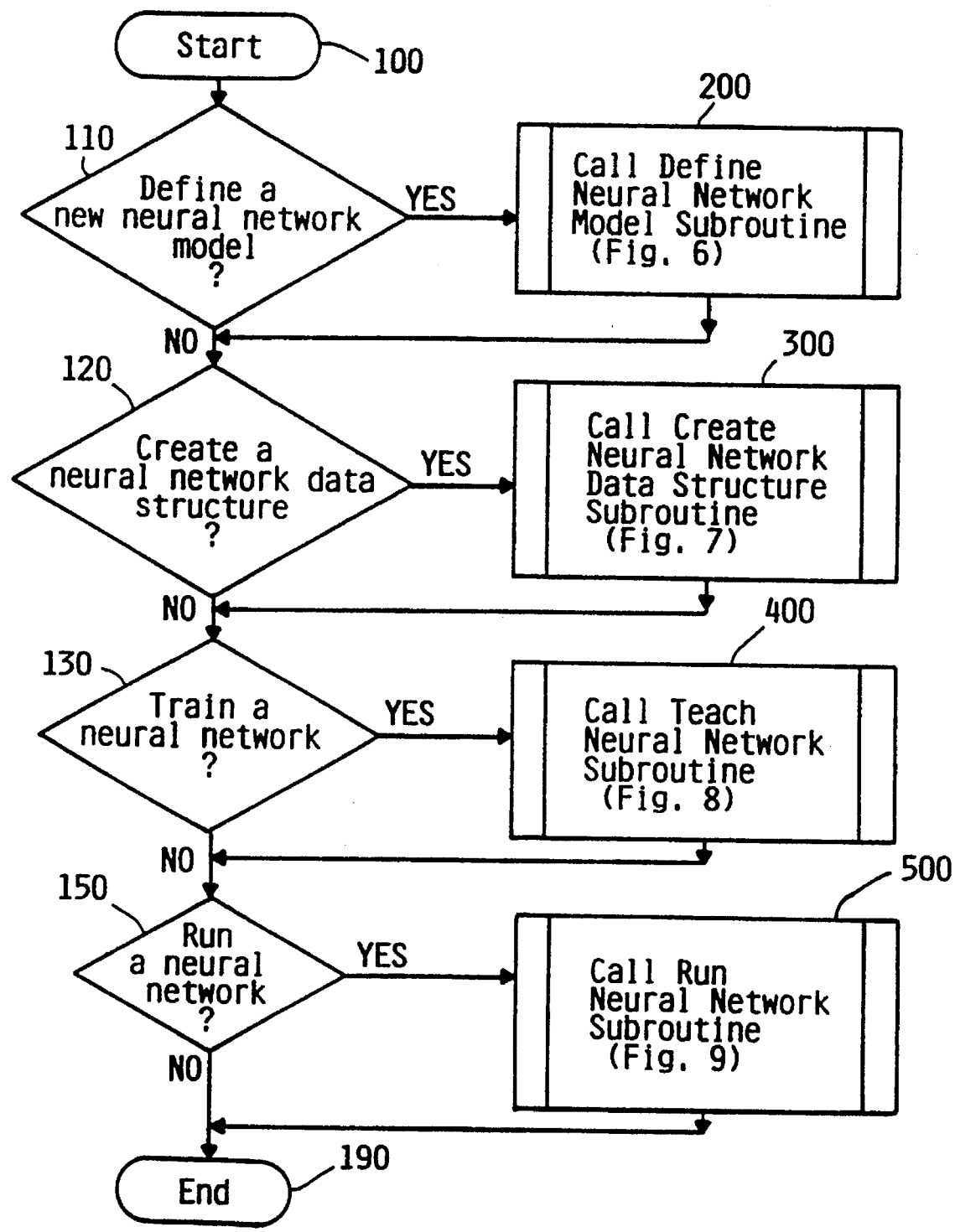
FIGS. 5, 6A, 6B, 6C, 6D, 7A, 7B, 8A, 8B, 8C, 9A and 9B, show the flowcharts of the invention
Figure 8A:
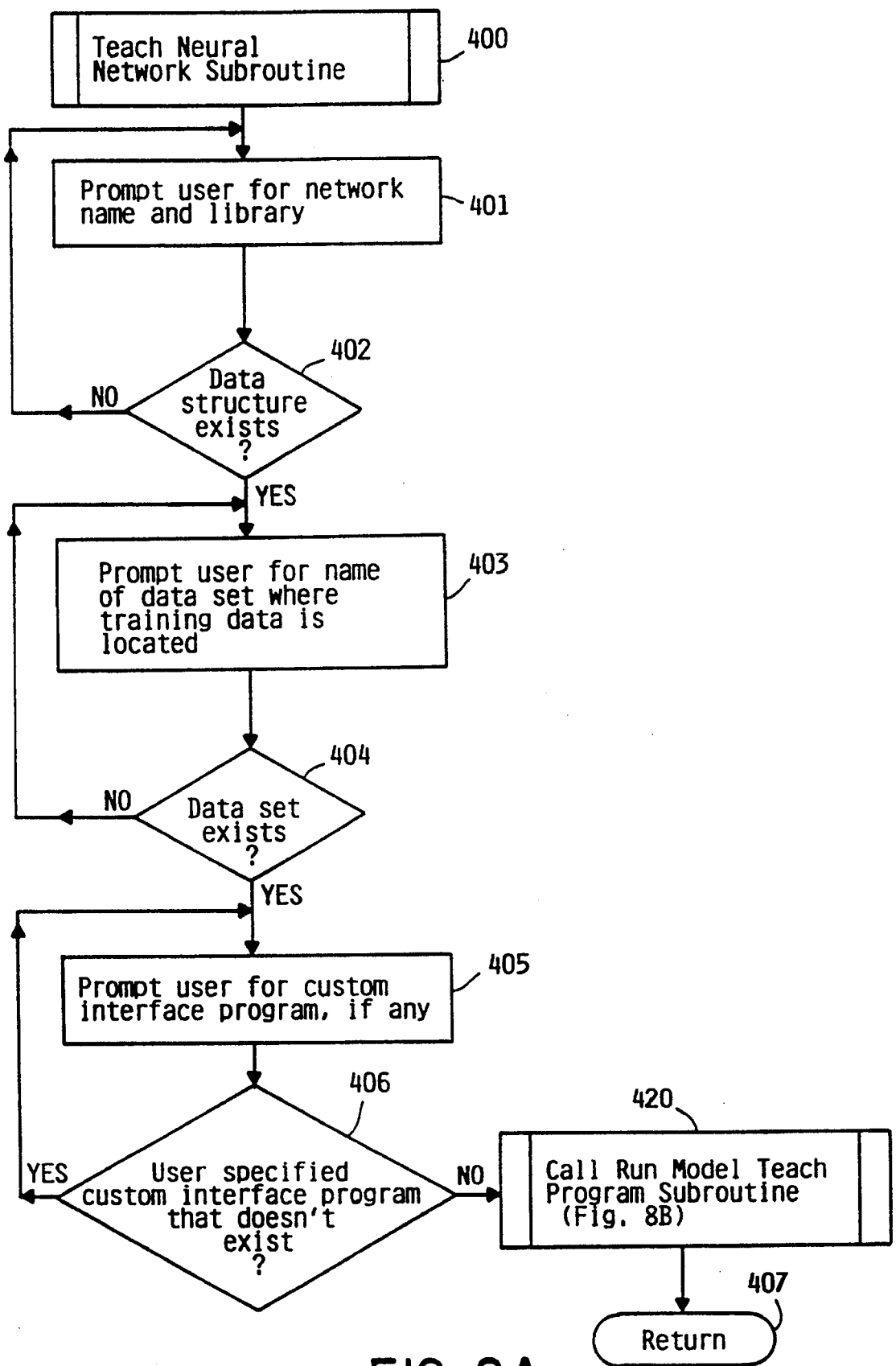
Figure 8B:
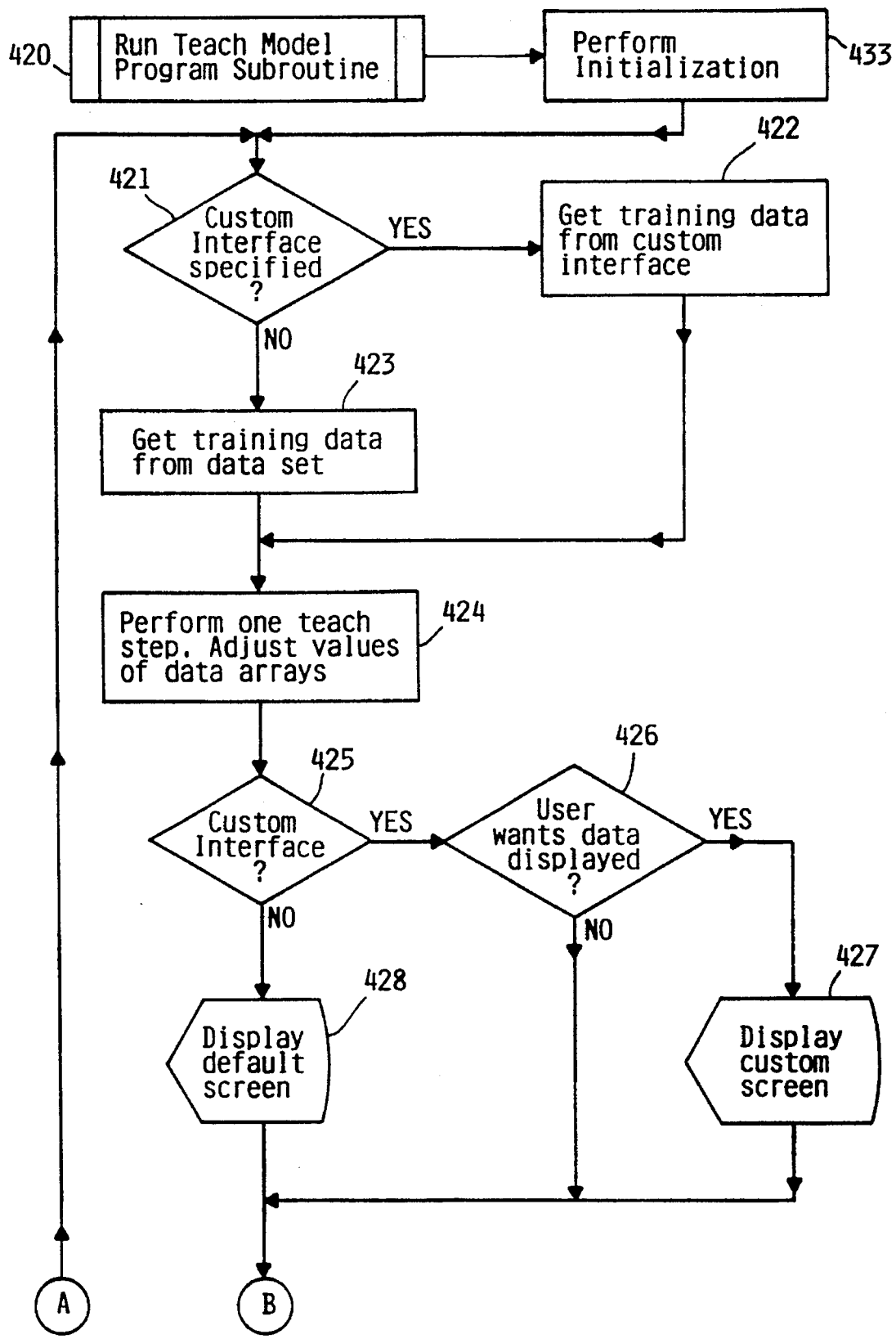
Figure 8C:
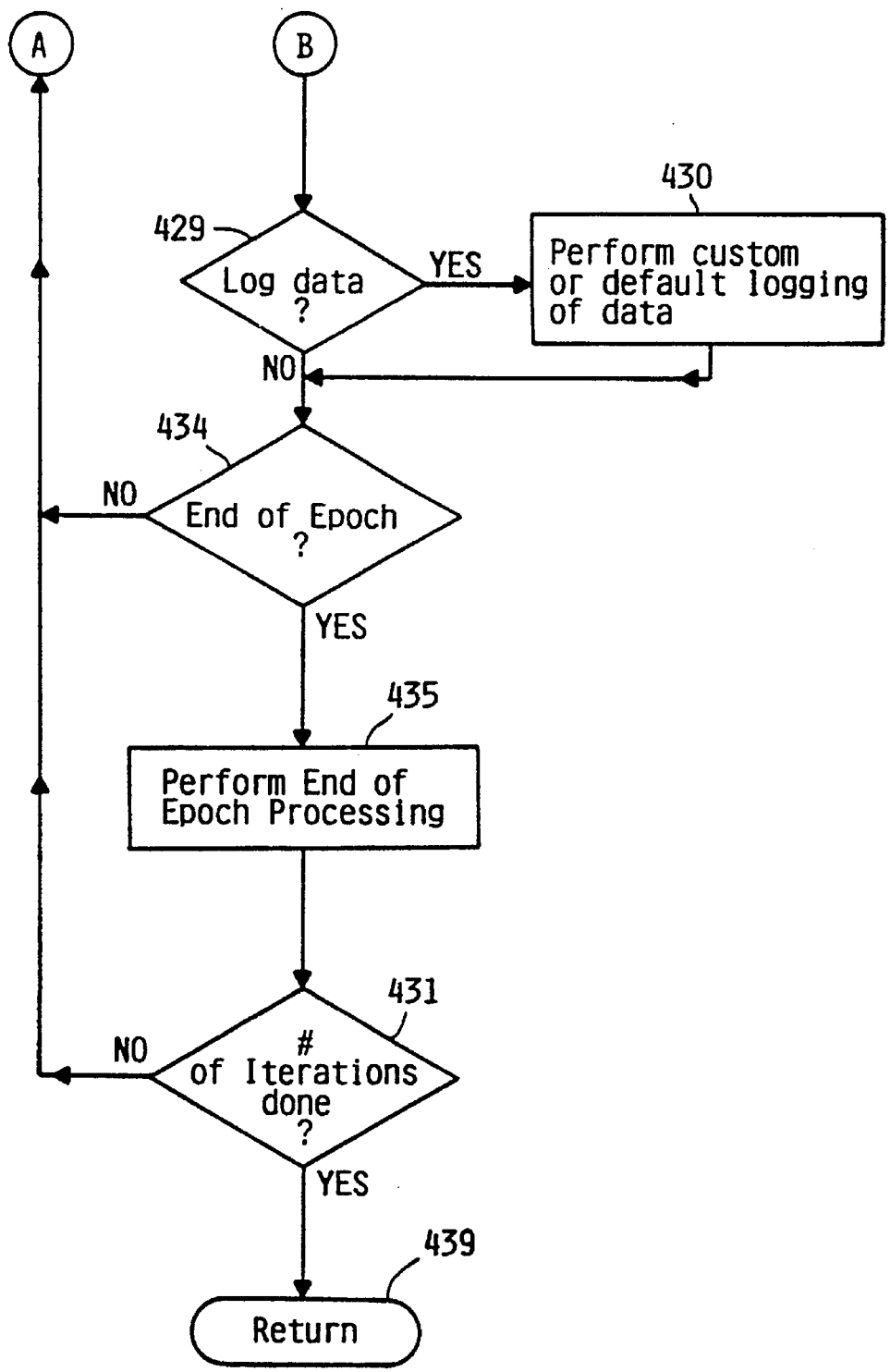

FIGS. 5–9 show the flowcharts of the invention, as performed by suitably programmed CPU 11 and/or co-processor 13. FIG. 5 shows an overview of the major steps in the neural network application program development process. Block 110 asks if there is a new neural network model to be defined. If so, block 200 calls the Define Neural Network Model Subroutine (FIG. 6). If not, block 120 asks if the user wishes to create a neural network data structure. A neural network data structure is created for each neural network. For example, one neural network data structure would be created for our coin identification neural network. If we also wanted to create another neural network to determine if an input number is odd or even, another neural network data structure would be created. If block 120 is answered affirmatively, block 300 calls the Create Neural Network Data Structure Subroutine (FIG. 7). If not, block 130 asks if the user wishes to train a neural network. A neural network needs to be trained with training data so that it can learn the relationship between input data and the desired output result, or extract relevant features from input data. If so, block 400 calls the Teach Neural Network Subroutine (FIG. 8). If not, block 140 asks if the user wants to run a neural network. If so, block 500 calls the Run Neural Network Model Subroutine (FIG. 9). If not, the program ends in block 190.

FIGS. 6A–6D describes Define Neural Network Model Subroutine 200. For example purposes, assume that an application developer wants to define a Back Propagation neural network model. Block 201 assigns a neural network model specific meaning to network string field 69, if desired. In our example, this field is not needed, so a null string is assigned. Block 202 assigns a neural network model specific meaning to Boolean parameters field 71. In our example, two Boolean parameters are assigned: Epoch update (Y/N) and Random Inputs (Y/N). Block 203 assigns a neural network model specific meaning to network size parameters field 72. In our example, five parameters are assigned: number of inputs, number of units in hidden layer 1, number of units in hidden layer 2, number of outputs, and number of processing units. Block 204 assigns a neural network model specific meaning to network index parameters field 13. In our example, the following parameters are assigned: first hidden unit 1, last hidden unit 1, first hidden unit 2, last hidden unit 2, and first output. Block 205 assigns a neural network model specific meaning to network training parameters field 74. In our example, the following parameters are assigned: learn rate, momentum, pattern error, epoch error, and tolerance. Block 206 assigns a neural network model specific meaning to network array offsets field 76. Since there are eleven data arrays to be defined in a Back Propagation neural network model, this field contains the byte offset to the first element of each of the eleven arrays located in body portion 90.

Figure 6A:
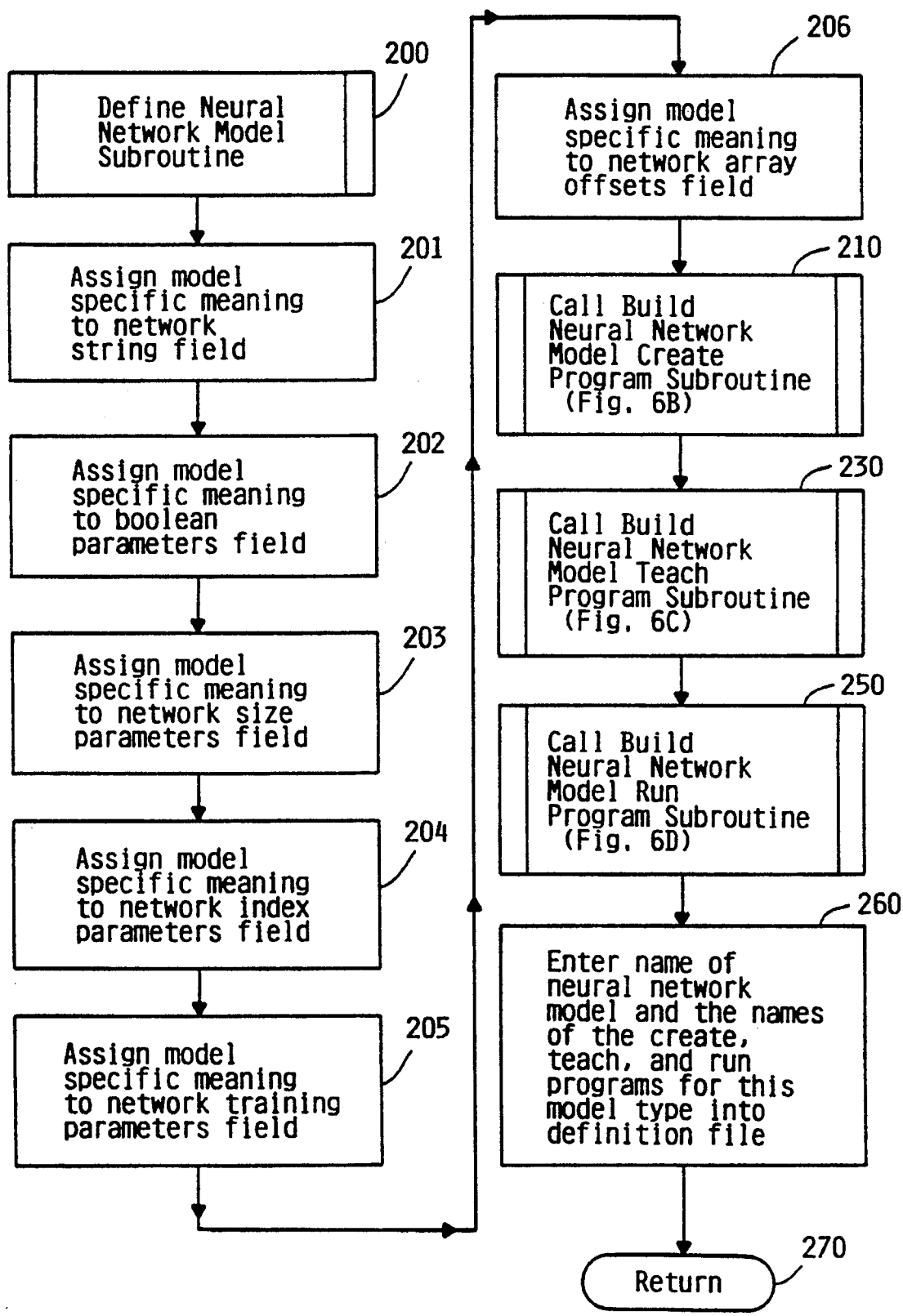
Figure 6B:
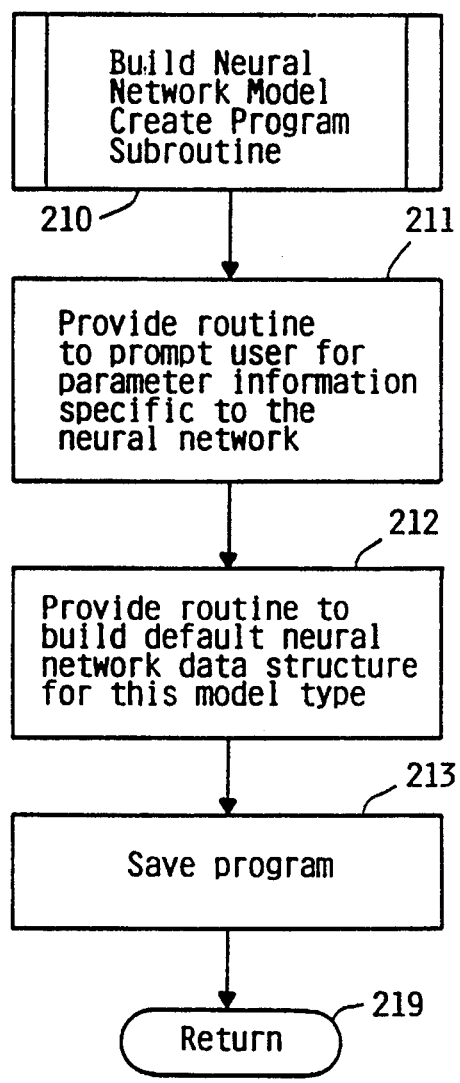

Block 210 calls the Build Neural Network Model Create Program Subroutine of FIG. 6B. Referring now to FIG. 6B, subroutine 210 requires that model specific routines are built so that they can be executed later by the Create Neural Network Data Structure Subroutine (FIG. 7). Block 211 provides a simple routine to prompt the user for parameter information specific to the neural network and check for erroneous and inconsistent parameter values. For example, block 211 would provide a routine that would prepare a screen similar to FIG. 12. The screen in FIG. 12, among other things, prompts the user for information about the following parameters: Number of input units, number of hidden units L1, number of hidden units L2, and number of output units.

Block 212 provides a routine to initialize the generic neural network data structure with default parameter values to create the default neural network data structure for this neural network model. All neural network models have the same generic neural network data structure. Each individual neural network model has its own unique default data structure. Therefore, all neural networks application programs (coin identification, odd/even number identification, etc) that use the same neural network model (such as Back Propagation) will input unique parameter values into the same default neural network data structure.

Block 213 saves the neural network model create program built in subroutine 210 by giving it a unique name and writing it to storage 12 (FIG. 1). In the preferred embodiment, this program can be written in any language desired which has the capability to access the data structure. Block 219 returns to block 230 of FIG. 6A.

Figure 6C:
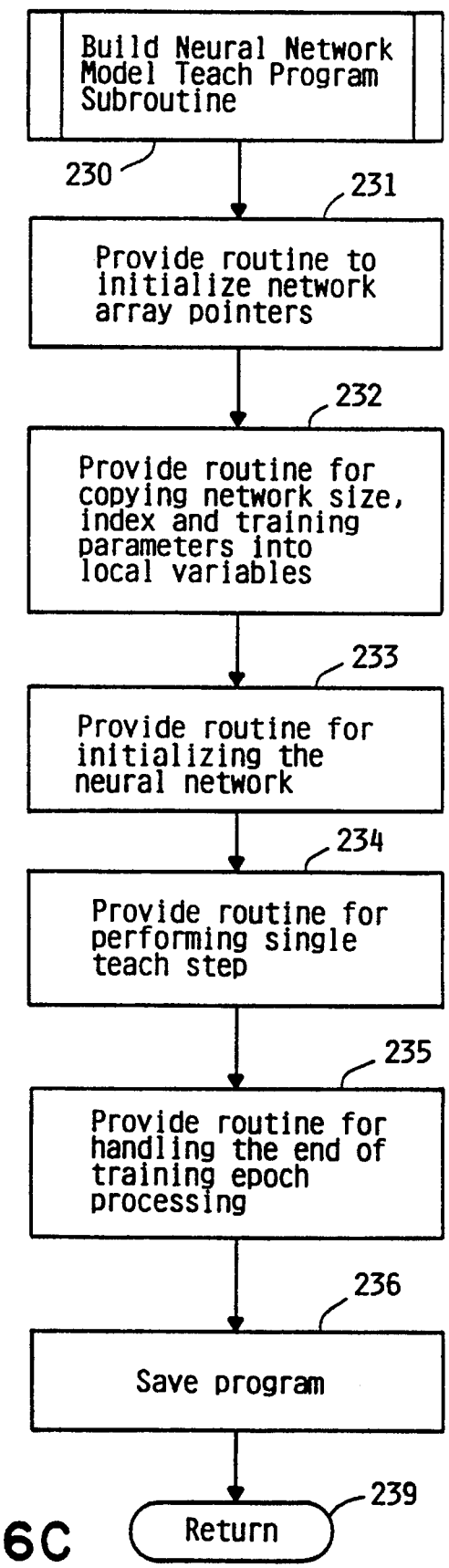

Block 230 calls the Build Neural Network Model Teach Program Subroutine of FIG. 6C. Referring now to FIG. 6C, subroutine 230 requires that model specific routines are written so that they can be executed later by the Teach Neural Network Subroutine (FIG. 8). Block 231 provides a simple routine to initialize the network array pointers in field 77 of FIG. 4. Block 232 provides a routine for copying network size, index and training parameters (fields 72–74) into local variables. This is done to improve performance and programming reliability. Block 233 provides a routine to initialize the neural network. Block 233 initializes counters and variables used by the neural network teach program. If network status field 68 is "Initialize", block 233 also initializes data array values (connection weights) and changes the status from "Initialize" to "Training" in field 68.

Block 234 provides a routine to perform a single teach step for this neural network model. This routine provides a mechanism, highly dependent on the neural network model, used to adjust the values of the data in the data array of body 90 so that the network can learn the desired functions. Those skilled in the art would take a neural network model description of its weight adjustment procedures (like those found in scholarly articles referenced in the before mentioned "AS/400 Neural Network Utility: User's Guide and Reference PRPQ P84189" on pages viii and ix) and simply convert this description to a program, using a computer language of their choice, that accesses the data structure of the invention.

Block 235 provides a routine to be performed when the training epoch processing has been completed. This routine can vary in complexity from a simple clean up procedure such as resetting variables to a more complex adjustment of data array values, depending on the neural network model. Those skilled in the art would take a neural network model description of its unique end of epoch processing and simply convert this description to a program, using a computer language of their choice, that accesses the data structure of the invention.

Block 236 saves the neural network model teach program built in subroutine 230 by giving it a unique name and writing it to storage 12 (FIG. 1). Block 239 returns to block 250 of FIG. 6A.

Figure 6D:
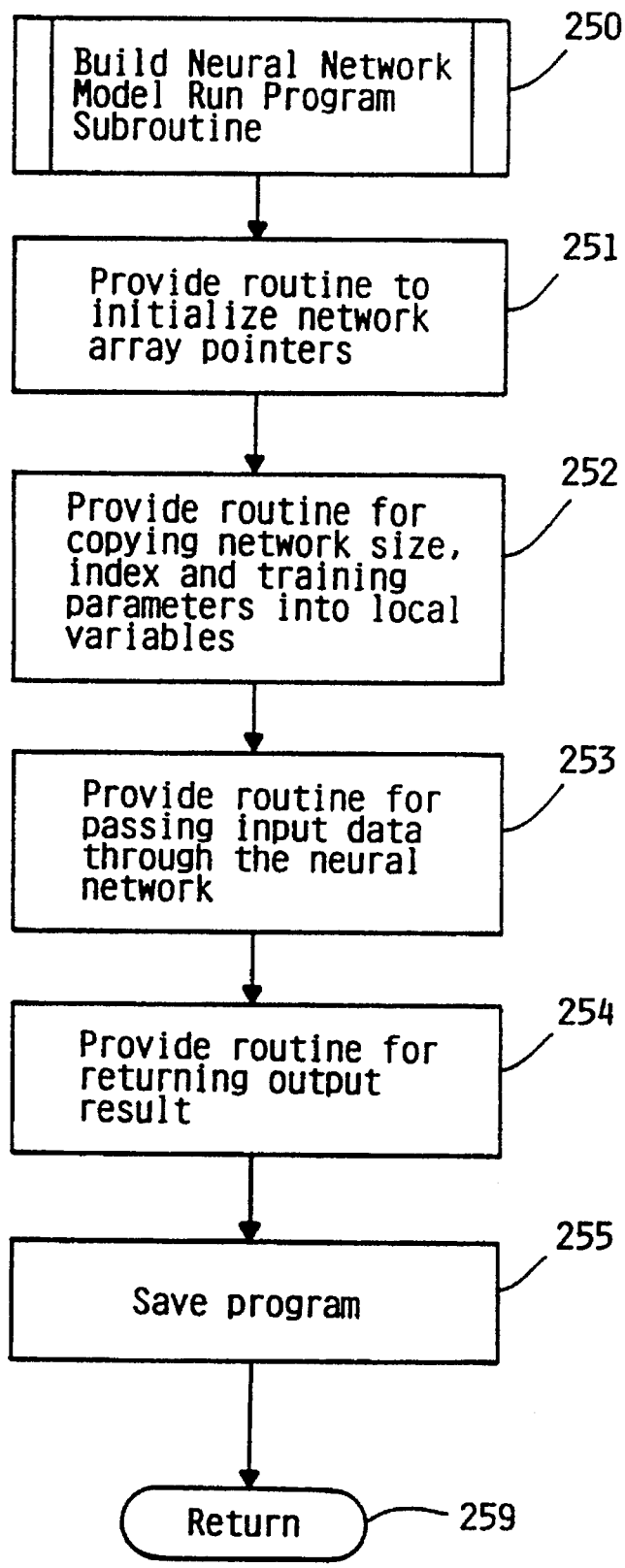

Block 250 calls the Build Neural Network Model Run Program Subroutine of FIG. 6D. Referring now to FIG. 6D, subroutine 250 requires that model specific routines are written so that they can be executed later by the Run Neural Network Subroutine (FIG. 8). Block 251 provides a simple routine to initialize the network array pointers in field 77 of FIG. 4. Block 252 provides a routine for copying network size, index and training parameters (fields 72–74) into local variables. Block 253 provides a routine to pass input data through the neural network. Block 254 provides a routine to return the output result to the Run Neural Network Subroutine. Block 255 saves the neural network model run program built in subroutine 250 by giving it a unique name and writing it to storage 12 (FIG. 1). Block 259 returns to block 260 of FIG. 6A.

Block 260 enters the name of the neural network model (such as "*BKP" for back propagation) and the names of the create, teach, and run programs for this model saved in blocks 213, 236, and 255 into a model definition file stored in storage 12. Block 270 returns to block 120 of FIG. 5.

In the preferred embodiment, five neural network models are predefined for the convenience of the application developer or user. The predefined models are Back Propagation, Adaptive Resonance Theory, Self Organizing Feature Maps, Self Organizing TSP Networks, and Bidirectional Associative Memories. Therefore, these models do not have to be defined by the user using the Define Neural Network Model Subroutine.

The remaining flowcharts will be discussed in conjunction with the exemplary coin identification neural network briefly discussed earlier. Let us assume that a user desires to create a neural network that determines if a coin is a penny, nickel, dime, or quarter based on input data that contains attribute information about the coin (whether it is copper or silver, whether the person is facing left or right, and whether there is a building, eagle, leaves, or a torch on the coin). The user creates this neural network by answering block 120 affirmatively in FIG. 5 and calling the Create Neural Network Data Structure Subroutine in block 300 (FIG. 7). Referring now to FIG. 7A, block 301 prompts the user for the name of the neural network and textual description information, as shown in FIG. 11. The user enters "COINNET" as the name of the neural network and "Test BKP network for Coin ID Problem" for the textual description. Block 302 prompts the user for the name of the neural network model. As shown in FIG. 11, the user enters "*BKP", an abbreviation for the Back Propagation neural network model. Block 303 checks to see if the model "*BKP" was defined in the model definition file in block 260 of FIG. 6A. If not, block 304 posts an error message and the user is asked to reenter the name of the neural network model in block 301. In our example, the model definition file contains the "*BKP" and block 330 calls the Run Model Create Program Subroutine for this model of FIG. 7B. The Model Create Program was prepared by the Build Model Create Program Subroutine of FIG. 6B, as has been discussed. The name of this program, along with the names of the Teach and Run programs for this model, are all contained in the model definition file.

Referring now to FIG. 7B, block 331 creates the default neural network data structure for this neural network model, by running the routine provided in block 212 of FIG. 6B. Block 332 prompts the user for neural network specific parameters, as shown in FIG. 12. In our example, the user specifies 6 input units (one each for coin color, coin profile, building, eagle, leaves, and torch), 2 hidden units (optimal for this example neural network) and 4 output units (one each for quarter, dime, nickel, and penny). Block 333 checks to see if the user supplied parameters are acceptable. Note that the routine provided by block 211 in FIG. 6B to prompt the user for these parameters placed limits on the user's input, such as 1–1000 output units. If the user input a value outside of any of these ranges, block 333 would be answered negatively, an error message would be posted in block 334, and the user would be asked to reenter the data in block 332. In addition, if the user inputs inconsistent parameter information, an error message would also be posted. In our example, the user supplied parameters are all acceptable, so block 335 fills in all user supplied parameters into the default data structure created by block 331. Block 336 performs calculations to fill in network index parameters field 73 and network array offsets field 76, based on the data now residing in the data structure. Block 337 initializes the Boolean parameters in field 71 (both to "N" in our example) and the training parameters in field 74 (to the values shown in FIG. 15 in our example) Block 338 allocates and initializes the data array fields located in body portion 90. In a back propagation neural network model, the following arrays would be allocated: activations, weights, threshold, weight deltas, threshold deltas, teach, error, delta, network input, weight derivative, and threshold derivative. These values are all initialized (as determined by the neural network model) in block 338. After block 338 is executed, our example neural network data structure contains all the information needed to teach the neural network how to identify coins from input data describing their attributes (or any other network having six inputs and four outputs). The subroutine returns in block 339 to block 305 in FIG. 7A. Block 305 returns to block 130 in FIG. 5.

Note that once a neural network data structure has been created, it can be transported to another computer system to be taught and/or run. The other computer system can be of an entirely different architecture and run an entirely different operating system than the computer system that created the neural network data structure. This flexibility is possible since the data structure contains data that can be used universally among different computer systems.

Since our user wants to train his newly created neural network to identify coins, he answers block 130 affirmatively in FIG. 5, thereby calling the Teach Neural Network Subroutine in block 400 (FIG. 8). Referring now to FIG. 8A, block 401 prompts the user for the name of the neural network and library as shown in FIG. 14. The user enters "COINNET" as the name of the neural network, "*CURLIB" as the library name. FIG. 14 also gives the user the opportunity to enter in the name of a custom interface program he can write to improve the usability of his particular neural network, if desired. In addition, the user is asked if he wants the training results to be logged or displayed, and (if a custom interface program exists) whether he wants the training data taken automatically from the data set or one step at a time from the user when he presses the enter key. Block 402 sees if the data structure specified in block 401 exists. If not, an error is posted and the user is returned to block 401. If so, block 403 prompts the user for the name of the data set where the training data is located, As shown in FIG. 13, the user enters "QANWCOIN" as the data set and "COINDEMO" as the data set member where the training data is located.

FIG. 10A shows the training data used in our example. Note that the data is stored in a symbolic (readable) format to improve usability and support a defined data base format, such as SQL or dBaseIII. Block 404 determines that the data set exists, so block 405 prompts the user for the name of the custom interface program, if any. If symbolic data is stored in the data set, a user specified custom interface program is needed to convert symbolic data (that humans understand) into numeric data (that neural networks understand). In our example, a custom interface program was specified in FIG. 13 (QNWGCOIN) and this program converted the symbolic training data shown in FIG. 10A into numeric training data shown in FIG. 10B by simply converting each input attribute into a "0" or a "1" in a binary string. A four digit output binary string represents the four possible output states in our example. If a custom interface program was specified but did not exist, block 406 is answered positively and flow of control goes back to block 405. Otherwise, block 420 calls the Run Model Teach Program Subroutine for this model of FIG. 8B. The Model Teach Program was prepared by the Build Model Teach Program Subroutine of FIG. 6C, as has been discussed.

Referring now to FIG. 8B, block 433 performs the initialization routine built by blocks 231, 232 and 233 of FIG. 6C. Block 421 checks to see if a custom interface program was specified. If so, as is the case in our example, block 422 gets the data from the custom interface program (numeric data shown in FIG. 10B). Otherwise, the training data is stored in numeric format in the data set and block 423 gets the data directly from the data set. Block 424 performs one teach step by running the neural network model dependent routine provided by block 234 of FIG. 6C. In our example, the values of the data in the data arrays in body 90 are adjusted to minimize the error between the desired and actual network outputs. Block 425 again checks for a custom interface program. If it exists, block 426 checks to see if the user wants the values of the data in the data structure to be displayed. If so, a custom screen generated by the custom interface program is displayed in block 427. Example custom screen are shown in FIGS. 19A–19D. If no custom interface program exists but the user wants data displayed, a default screen is displayed in block 428. An example default screen is shown in FIG. 15.

Referring again to FIG. 8B, block 429 checks to see if the user wanted the data logged. If so, block 430 performs custom or default logging of data. In either event, block 434 checks to see if one epoch has been completed. An epoch is complete when all training data in the data set has been processed once. If not, control loops back to block 421 to get the next training data. If one epoch has been completed, block 435 performs the end of epoch processing routine built by block 235 in FIG. 6C. In our example, the end of epoch processing routine determines if the difference between the actual and desired output for every output unit for all training data is less than the specified tolerance (one of the training parameters in field 74). If so, it sets the network status in field 68 to "locked". When the status of the neural network is "locked" the values of the data arrays are not permitted to change.

Block 431 then checks to see if the number of iterations specified by the user has been completed. Until this happens, block 431 is answered negatively and flow returns back to block 421 to perform another iteration through the training data. When the training period is complete, block 431 is answered positively. The subroutine returns in block 439 to block 407 of FIG. 8A. Block 407 returns to block 140 of FIG. 5.

Since our user wants to run his newly trained neural network to identify coins, he answers block 140 affirmatively in FIG. 5, thereby calling the Run Neural Network Subroutine in block 500 (FIG. 9). Alternatively, any application program can call the Run Neural Network Subroutine directly, thereby bypassing FIG. 5.

Figures 9A, 9B:
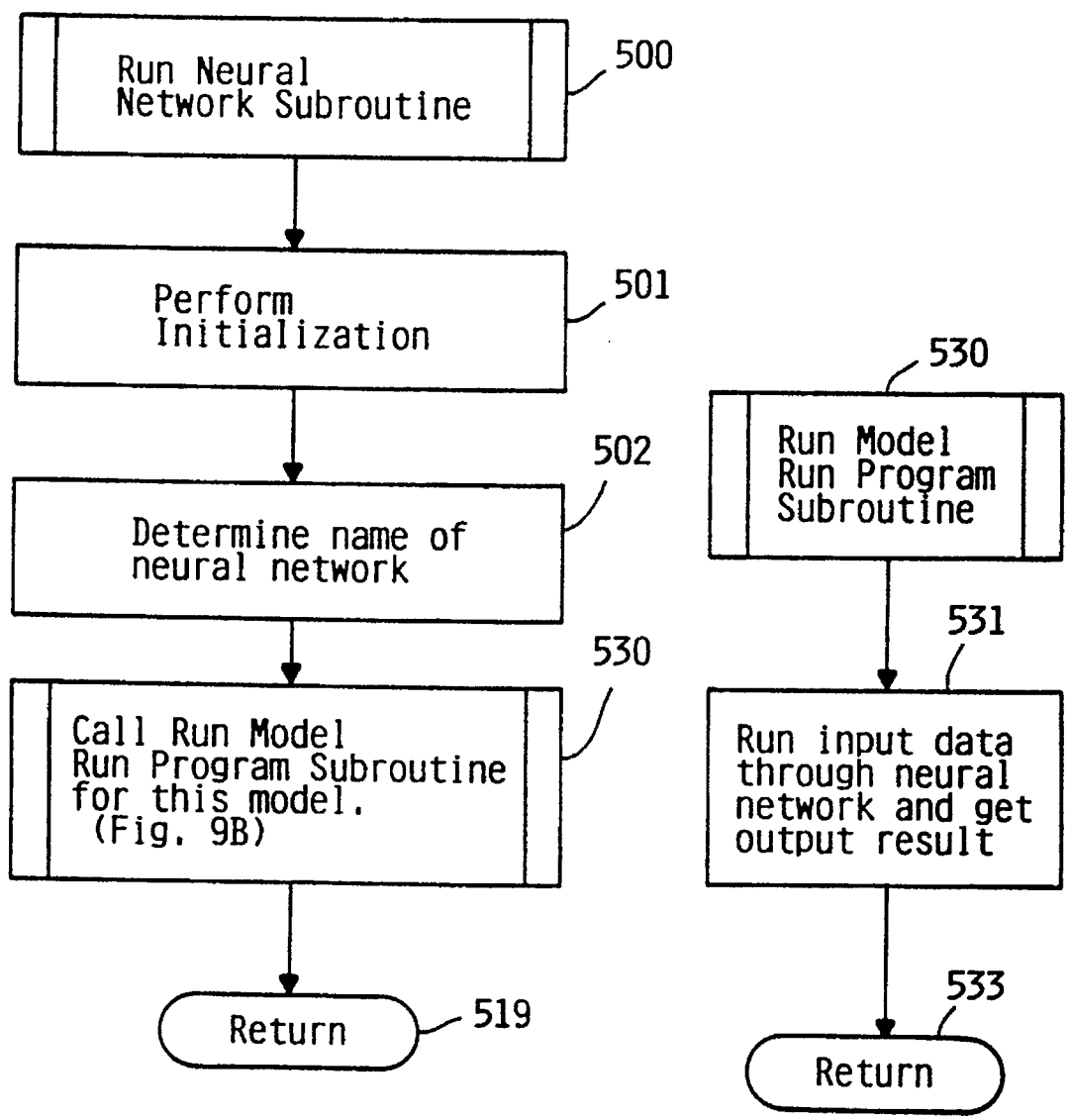

Referring now to FIG. 9A, block 501 performs the initialization routine built by blocks 251 and 252 of FIG. 6D. Block 502 determines the name of the neural network. Block 530 calls the Run Model Run Program Subroutine for this model of FIG. 9B. The Model Run Program was prepared by Build Model Run Program Subroutine of FIG. 6D, as has been discussed.

Referring now to FIG. 9B, block 531 runs the input data through the neural network and passes it back to Run Neural Network Subroutine 500 when block 533 returns to block 510 (FIG. 9A). Block 531 performs the routine built by blocks 253 and 254 in FIG. 6D.

Subroutine 500 returns in block 519 to block 190 in FIG. 5 where the program ends, or, alternatively, returns to the application program that called it.

FIGS. 19A–19D shows how our example coin identification neural network correctly identified a penny, nickel, dime and quarter. FIG. 20 shows what would happen if the following input data was run through the neural network: BRONZE LEFT Y N N N (numerically represented by 011000). We are asking our network to identify a bronze coin with a left profile, a building, but no eagle, leaves, or a torch. The network guesses that this coin is a nickel, but the nickel guess only scores a 0.4865323. The neural network is most confident by having a score approaching 1.00000. In this example, it clearly is not too confident that this coin is a nickel. In fact, there is no such coin having these attributes, so the network was correct to have a high degree of uncertainty.

While this invention has been described with respect to the preferred embodiment, it will be understood by those skilled in the art that various changes in detail may be made therein without departing from the spirit, scope and teaching of the invention. Accordingly, the herein disclosed is to be limited only as specified in the following claims.

What is claimed is:

1. A program product for creating a default neural network data structure for a neural network in a computer system, comprising:

a recording medium containing instructions capable of being executed on the computer system;

means, recorded on the recording medium, for creating a common neural network data structure in memory of the computer system, wherein the common neural network data structure is common and generic to all of a plurality of defined neural network models, wherein the common neural network data structure defines a structure and organization of a plurality of data arrays in the memory, and wherein the plurality of data arrays have data types and an order within the neural network data structure;

means, recorded on the recording medium, for selecting a neural network model from the plurality of defined neural network models for said neural network;

means, recorded on the recording medium, for creating said default neural network data structure for said neural network model selected by said selecting means by inputting initial values for a plurality of data arrays into said default neural network data structure, wherein the default neural network data structure has the same structure and organization as the common neural network data structure;

means, recorded on the recording medium, for prompting for a plurality of parameters specific to said neural network; and means, recorded on the recording medium, for inputting said plurality of parameters into said default neural network data structure.

2. The program product of claim 1, wherein the inputting means is common to all of the plurality of neural network models.

3. The program product of claim 1, further comprising:

means, recorded on the recording medium, for selecting a second neural network model from the plurality of defined neural network models for said neural network.

4. The program product of claim 3, wherein the default neural network data structure further comprises a pointer to a previous default neural network data structure, wherein the previous default neural network data structure has the same structure and organization as the common neural network data structure, and wherein the previous default neural network data structure corresponds to the second selected neural network model.

5. The program product of claim 1, further comprising:

means, recorded on the recording medium, for selecting a third neural network model from the plurality of defined neural network models for said neural network.

6. The program product of claim 5, wherein the default neural network data structure further comprises a pointer to a next default neural network data structure, wherein the next default neural network data structure has the same structure and organization as the common neural network data structure, and wherein the next default neural network data structure corresponds to the third selected neural network model.

7. The program product of claim 1, wherein the common neural network data structure further comprises a neural network model type field.

* * * * *